C. D. GOODRICH.
Coffee Pot.
No. 123,258.  Patented Jan. 30, 1872.
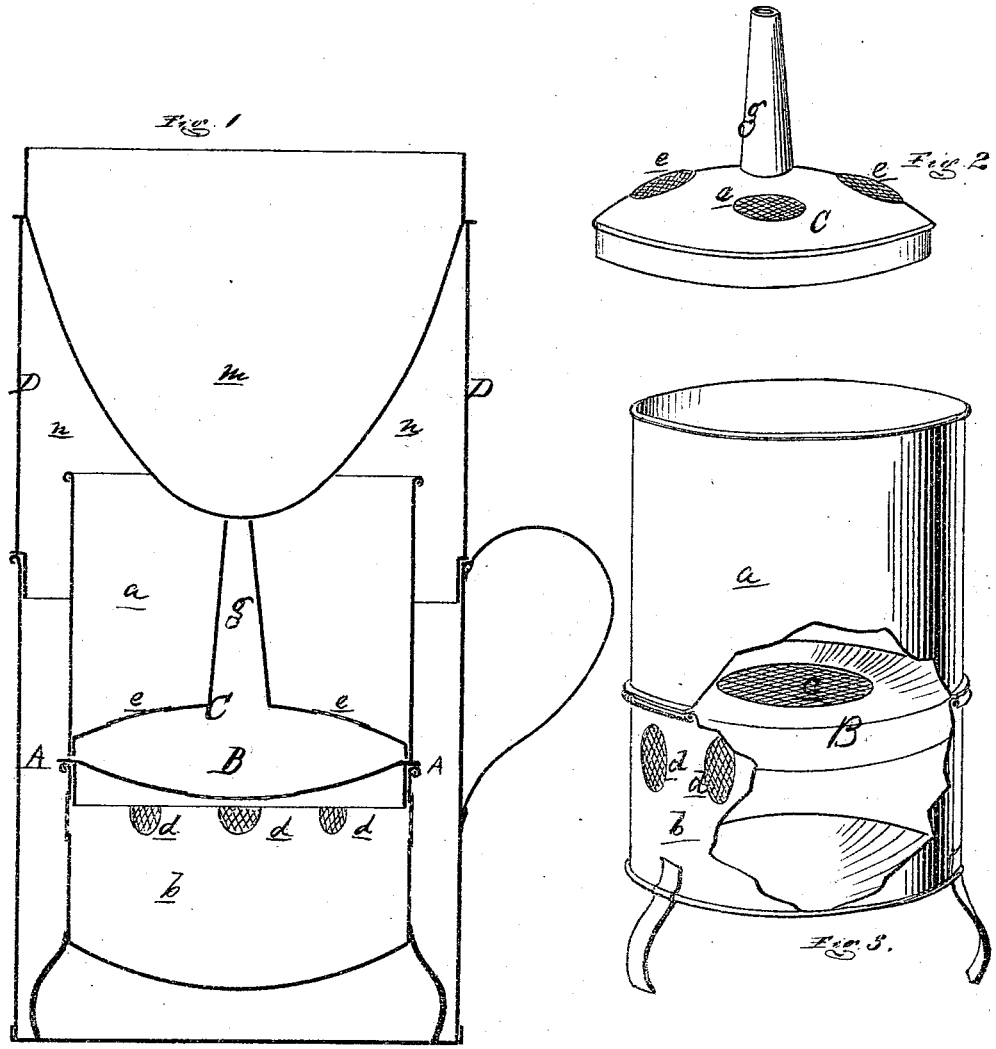
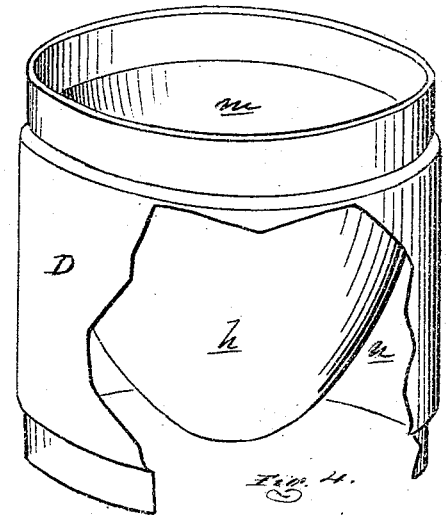

UNITED STATES PATENT OFFICE.

CORNELIUS D. GOODRICH, OF ANN ARBOR, MICHIGAN, ASSIGNOR TO HIMSELF AND HAMMON TEATS, OF SAME PLACE.

IMPROVEMENT IN COFFEE-POTS.

Specification forming part of Letters Patent No. 123,258, dated January 30, 1872.

*To whom it may concern:*

Be it known that I, CORNELIUS D. GOODRICH, of Ann Arbor, in the county of Washtenaw and State of Michigan, have invented a new and useful Improvement in a Device for Condensing the Vapors of Coffee, Tea, Malt Liquors, &c.; and I do declare that the following is a true and accurate description thereof, reference being had to the accompanying drawing and to the letters of reference marked thereon and being a part of this specification, in which—

Figure 1 is a vertical section; Fig. 2, a perspective of the follower; Fig. 3, a perspective of the holder and double filter with a portion of the shell broken out; Fig. 4, a perspective of the reversible condenser with a portion of the shell broken out.

Like letters refer to like parts in each figure.

The nature of this invention relates to the construction of a boiler or steeper for tea, coffee, malt liquors, or anything where it is desirable to retain the vapors. The invention consists, first, in the application of a condenser to a boiler for the purpose of retaining the vapors of tea, coffee, malt liquors, &c., said vapors being condensed and returned to the liquor in the boiler; second, in the peculiar construction and operation of the holder and double filter in connection with the follower; third, in the construction and arrangement of the various parts, as more fully hereinafter set forth.

In the accompanying drawing, A represents a vessel of any desired form or size. B is a holder or receiver, made in two parts, $a$ $b$, the former being provided with a strainer or filter, $c$, in its bottom, and the latter with strainers or filters $d$. This holder should be smaller in diameter than the vessel A, into which the holder is placed. C is a follower, designed to fit the interior diameter of the holder B. This follower is provided with strainers or filters $e$, and a conically-shaped tube, $g$, rises vertically from its center. D is a cylinder, either end of which is so constructed as to fit the top of the vessel A. Within this cylinder is secured the hollow cone $h$, which completely fits the interior diameter of the cylinder D. This cylinder, with its cone, forms the condenser; and no matter which end of the cylinder is uppermost, the spaces $m$ or $n$, the former being inside the cone and the latter outside the same, will receive cold water to facilitate the condensation of the vapors rising from the vessel A or boiler B into the cylinder D.

I do not intend to confine myself to the exact construction above described, as the same results may be obtained from different forms.

To make coffee the follower should be taken out of the holder and the coffee placed therein. The follower should then be replaced, and the vessel A filled or partially filled with hot water. When ebullition commences the water will pass upward through the filters in the holder through the coffee, and up through the filters and tube in the follower, and be deflected by the conical diaphragm in the top cylinder into the vessel to go the same round again. The cone itself, or the space around it, depending upon the position, may be filled with cold water, for the purpose hereinbefore described. Suitable faucets may be arranged for drawing off the coffee, which will be found very clear and aromatic, and for drawing off the heated water from the upper cylinder, whenever desired, or as it may become necessary to replace with cold water.

What I claim as my invention, and desire to secure by Letters Patent, is—

1. The combination of the condenser D $h$ with the vessel A, substantially as and for the purposes set forth.

2. In boilers, the construction and operation of the holder, provided with double filters and in connection with the follower C, when arranged for the purposes set forth.

3. The combination of the vessel A, holder B, follower C, and cylinder D, when each part is constructed and arranged to operate substantially as and for the purposes set forth.

CORNELIUS D. GOODRICH.

Witnesses:
 M. H. GOODRICH,
 JNO. M. PERKINS.